US009825878B2

(12) United States Patent
Kulkarni et al.

(10) Patent No.: US 9,825,878 B2
(45) Date of Patent: Nov. 21, 2017

(54) DISTRIBUTED APPLICATION FRAMEWORK FOR PRIORITIZING NETWORK TRAFFIC USING APPLICATION PRIORITY AWARENESS

(71) Applicant: CISCO TECHNOLOGY, INC., San Jose, CA (US)

(72) Inventors: Karthik Krishna Kulkarni, Fremont, CA (US); Raghunath O. Nambiar, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 180 days.

(21) Appl. No.: 14/499,000

(22) Filed: Sep. 26, 2014

(65) Prior Publication Data
US 2016/0094480 A1 Mar. 31, 2016

(51) Int. Cl.
*H04L 12/927* (2013.01)
*H04L 12/801* (2013.01)
*H04L 12/851* (2013.01)
*H04L 12/859* (2013.01)

(52) U.S. Cl.
CPC ............ *H04L 47/805* (2013.01); *H04L 47/12* (2013.01); *H04L 47/2441* (2013.01); *H04L 47/2475* (2013.01)

(58) Field of Classification Search
CPC ... H04L 47/805; H04L 47/2441; H04L 47/12; H04L 47/2475
See application file for complete search history.

(56) References Cited

U.S. PATENT DOCUMENTS 5,812,773 A * 9/1998 Norin ................. H04L 12/18
709/201
5,889,896 A * 3/1999 Meshinsky ............ G06K 9/00
382/305
7,111,177 B1 * 9/2006 Chauvel ................ G06F 1/206
713/300

(Continued)

FOREIGN PATENT DOCUMENTS

EP   2211502   7/2010

OTHER PUBLICATIONS

U.S. Appl. No. 14/617,591, filed Feb. 9, 2015, entitled "Distributed Application Framework That Uses Network and Application Awareness for Placing Data," Inventors: Raghunath O. Nambiar et al.

(Continued)

*Primary Examiner* — Rasheed Gidado
(74) *Attorney, Agent, or Firm* — Polsinelli PC

(57) ABSTRACT

A system and a method for prioritizing network traffic using application awareness and network awareness in a network environment is disclosed. An exemplary method can include receiving a network traffic priority for network traffic associated with a job performed by a distributed application; and based on the network traffic priority, assigning the network traffic to a network classification model, such as an access control list, associated with a network element for directing the network traffic in a network. The network classification model is associated with a network traffic priority class having defined quality of service (QoS) features, such that the network traffic traverses the network according to the defined QoS features.

16 Claims, 3 Drawing Sheets

(56) References Cited

U.S. PATENT DOCUMENTS

| | | | |
|---|---|---|---|
| 7,606,147 B2 | 10/2009 | Luft | |
| 7,647,594 B2* | 1/2010 | Togawa | G06F 9/4887 710/100 |
| 7,773,510 B2* | 8/2010 | Back | H04L 45/04 370/230 |
| 8,010,698 B2 | 8/2011 | Carter | |
| 8,121,117 B1 | 2/2012 | Amdahl | |
| 8,560,639 B2 | 10/2013 | Murphy et al. | |
| 8,589,543 B2 | 11/2013 | Dutta | |
| 8,656,024 B2 | 2/2014 | Krishnan | |
| 8,797,867 B1* | 8/2014 | Chen | H04L 41/5022 370/232 |
| 8,959,526 B2* | 2/2015 | Kansal | G06F 9/5077 709/223 |
| 2004/0131059 A1* | 7/2004 | Ayyakad | H04L 45/60 370/389 |
| 2006/0146825 A1* | 7/2006 | Hofstaedter | H04L 45/00 370/392 |
| 2007/0223487 A1* | 9/2007 | Kajekar | H04L 12/24 370/395.2 |
| 2008/0198752 A1 | 8/2008 | Fan et al. | |
| 2009/0178058 A1 | 7/2009 | Stillwell | |
| 2009/0182874 A1 | 7/2009 | Morford | |
| 2012/0236716 A1* | 9/2012 | Anbazhagan | H04L 41/5022 370/235 |
| 2012/0272025 A1 | 10/2012 | Park et al. | |
| 2013/0104140 A1 | 4/2013 | Meng et al. | |
| 2013/0250770 A1 | 9/2013 | Zou | |
| 2014/0059310 A1 | 2/2014 | Du et al. | |
| 2014/0098762 A1 | 4/2014 | Ghai | |
| 2014/0136779 A1 | 5/2014 | Guha et al. | |
| 2014/0140211 A1 | 5/2014 | Chandrasekaran | |
| 2014/0188825 A1 | 7/2014 | Muthukkaruppan et al. | |
| 2014/0245298 A1 | 8/2014 | Zhou et al. | |
| 2014/0314078 A1* | 10/2014 | Jilani | H04L 45/16 370/390 |
| 2015/0117199 A1* | 4/2015 | Chinnaiah Sankaran | H04L 47/2433 370/235 |
| 2015/0178133 A1* | 6/2015 | Phelan | G06F 9/5016 718/103 |
| 2016/0013990 A1 | 1/2016 | Kulkarni et al. | |

OTHER PUBLICATIONS

U.S. Appl. No. 14/327,385, filed Jul. 9, 2014, entitled "Network Traffic Management Using Heat Maps With Actual and Planned/Estimated Metrics," Inventors: Karthik Kulkarni, et al.

Szymaniak, et al., "Latency-Driven Replica Placement", vol. 47 No. 8, IPSJ Journal, Aug. 2006, 12 pages; ftp://ftp.minix3.org/pub/steen/papers/2006.ipsj.pdf.

Xianglong Ye, et al., "A Novel Blocks Placement Strategy for Hadoop," 2012 IEEE/ACTS 11th International Conference on Computer and Information Science, 2012 IEEE, 5 pages; http://www.cs.odu.edu/~mukka/cs775s13/Presentations/papers/paper5.pdf.

Lynch, Sean, "Monitoring cache with Chaspin," Facebook Engineering, Sep. 19, 2012.

USPTO Mar. 10, 2016 Non-Final Office Action from U.S. Appl. No. 14/327,385.

USPTO Aug. 23, 2016 Final Office Action from U.S. Appl. No. 14/327,385.

* cited by examiner

DISTRIBUTED APPLICATION FRAMEWORK FOR PRIORITIZING NETWORK TRAFFIC USING APPLICATION PRIORITY AWARENESS

TECHNICAL FIELD

This disclosure relates in general to the field of communications and, more particularly, to a system and a method for prioritizing network traffic in a network environment.

BACKGROUND

Data centers are increasingly used by enterprises to achieve collaboration, store data, manage resources, etc. A typical data center network contains myriad network elements. The network connecting the network elements provides secure user access to data center services and an infrastructure for deployment, interconnection, and aggregation of shared resource as required, including applications, servers, appliances, and storage. Improving operational efficiency and optimizing utilization of data center resources are some of the challenges facing data center managers. Data center managers want a resilient infrastructure that consistently supports diverse applications and services and protects the applications and services against disruptions. To address these considerations, data centers are turning to distributed application frameworks, striving to provide infrastructure that optimizes deployment of distributed application frameworks, while enhancing network performance associated with using distributed application frameworks.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system and a method for prioritizing network traffic using application awareness and network awareness in a network environment is disclosed. An exemplary method can include receiving a network traffic priority for network traffic associated with a job performed by a distributed application; and based on the network traffic priority, assigning the network traffic to a network classification model, such as an access control list, associated with a network element for directing the network traffic in a network. The network classification model is associated with a network traffic priority class having defined quality of service (QoS) features, such that the network traffic traverses the network according to the defined QoS features.

The network traffic priority can be based on a user priority associated with a user that initiated the job and a task priority associated with a task of the job that generates the network traffic. The user priority can be assigned to the job by the user or assigned to the job based on a default user priority associated with the user. In some embodiments, a priority level of the task priority varies based on underlying data of the network traffic, context that generated the underlying data of the network traffic, or both. The QoS features can define a percentage of a bandwidth of a network link reserved for the network traffic priority class and/or a maximum output rate for the network traffic priority class for the network element when the network is congested.

The method can further include receiving network traffic flow information for the network traffic; and identifying the network element based on the network traffic flow information. The network element may be at least one switch involved with directing the network traffic, wherein the network traffic is assigned to an access control list attached to the at least one switch. In some embodiment, assigning the network traffic to the network classification model includes updating an access control list with an access control list entry that includes a source port, a source IP address, a destination port, and a destination IP address associated with the network traffic. The method can further include removing the access control list entry once network traffic associated with the task ceases.

Example Embodiments

Figure 1:
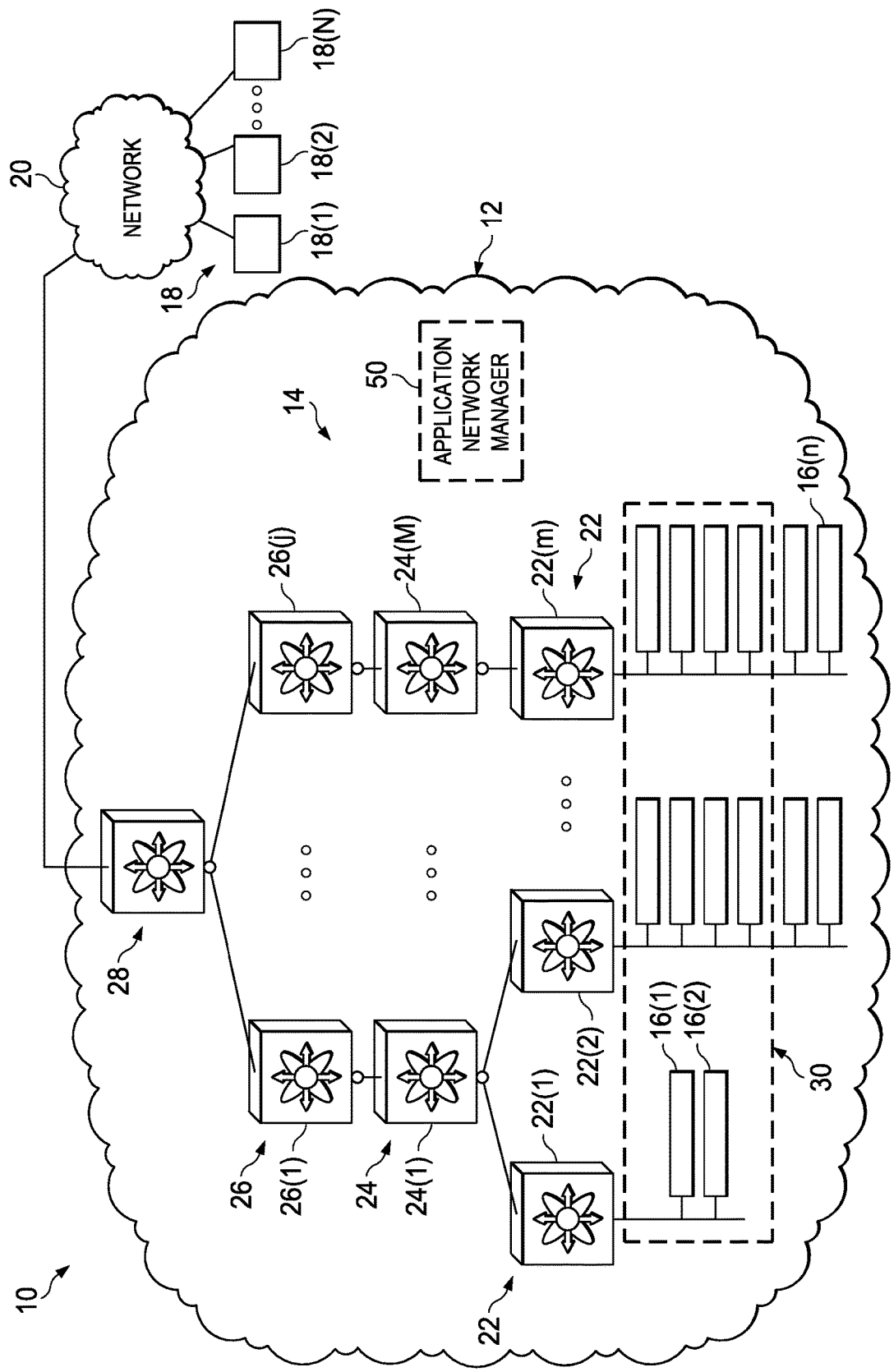
FIG. 1 is a simplified schematic block diagram illustrating a communication system for prioritizing network traffic in a network environment.
Figure 2:
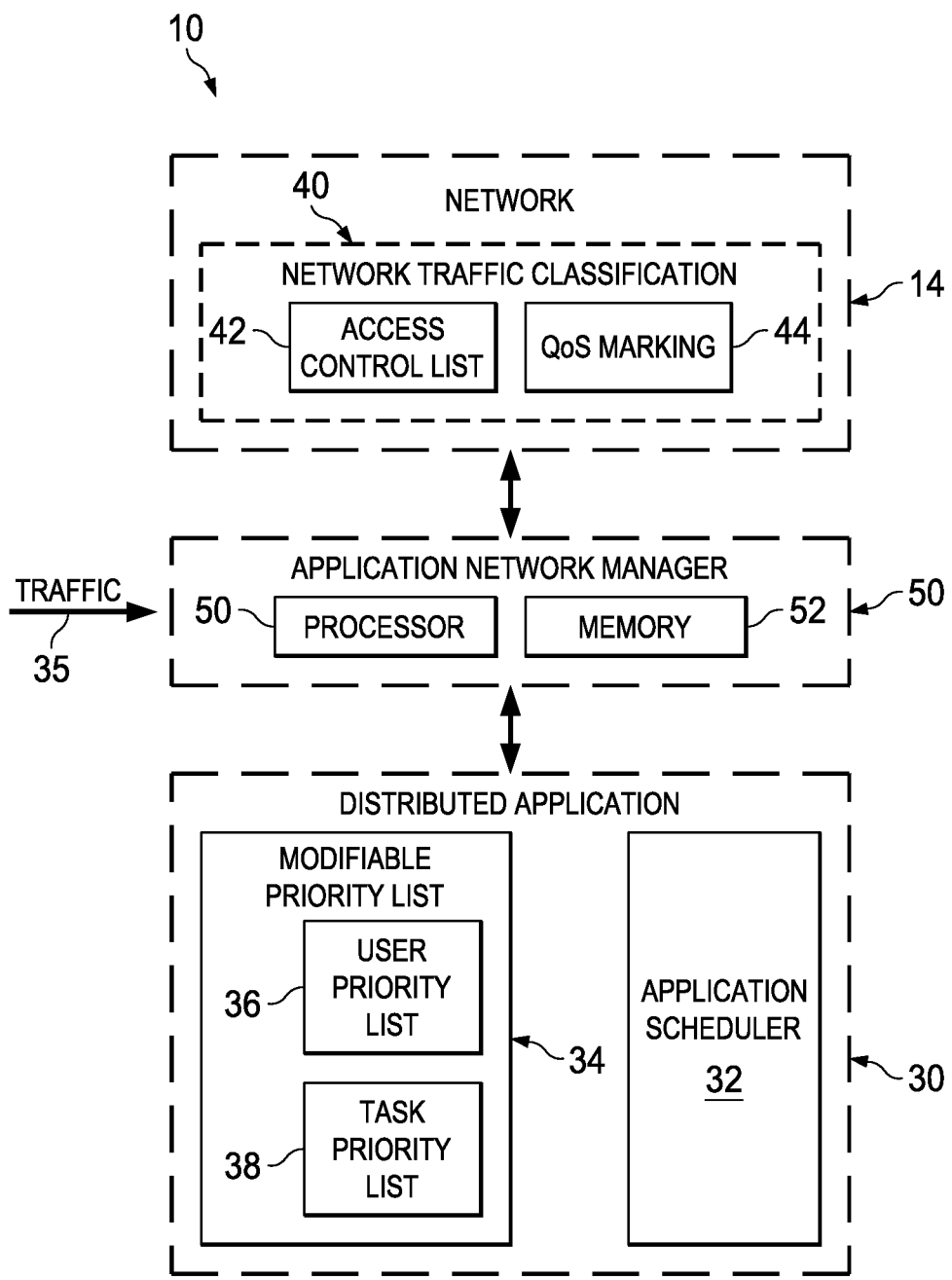
FIG. 2 is a simplified block diagram illustrating example details of the communication system.

FIG. 1 is simplified schematic block diagrams illustrating a communication system 10 for prioritizing network traffic (also referred to as data traffic) in a network environment; and FIG. 2 is a simplified block diagram illustrating an exemplary configuration of communication system 10. For ease of discussion, FIG. 1 and FIG. 2 will be described concurrently. In FIG. 1, communication system 10 includes a network 12. In various embodiments, network 12 can represent an enterprise network, such as a data center network, operated and controlled by a particular entity or organization. In some configurations, network 12 can provide other networks with access to network 12 and authorization to set up secure tunnel(s) with network 12 in accordance, for example, with service level agreements (SLAs).

Network 12 includes a network 14 (generally shown as various links) that interconnect hosts 16(1), 16(2), . . . , and 16(n) (generally referred to as hosts 16) and external hosts 18(1), 18(2), . . . , and 18(N) (generally referred to as external hosts 18), where n represents a total number of hosts 16 and N represents a total number of external hosts 18. External hosts 18 connect to network 12 over an external network 20. Hosts 16 can communicate (for example, by receiving/forwarding packets) with each other over network 12, and hosts 16 can communicate (for example, by receiving/forwarding packets) with external hosts 18 connected to network 12 over external network 20. Hosts 16 and/or external hosts 18 can provide various information technology services, including web services, database services, data processing services, directory services, and/or other services to network elements. In various embodiments, hosts 16 and/or external hosts 18 can be associated with users (clients) and/or groups that use information technology services provided by network 12. As used herein, the term "host" may include any network element, physical (for example, servers) or virtual (for example, virtual machines), connected to other network elements over a network; and the term "external host" may include any host connected to a network (e.g., network 12) over an external network (e.g., external network 20). Hosts can be servers, applications, network storage facilities (for example, a database and/or a memory), and/or other network elements. In a client-server model, hosts may include servers. In a peer-to-peer network, each computer may be a host.

Network 14 includes various network nodes configured to perform aggregate/core/access roles. For example, network 14 may include access switches, aggregation switches, core switches to aggregate and distribute ingress (upstream traffic) and egress (downstream traffic) traffic, etc. A plurality of switches (virtual and/or physical) may be provided at each access, aggregation, and core level to achieve redundancy within network 12. In the depicted embodiment, network 14 includes top of rack (ToR) switches 22(1), 22(2), ..., and 22(m) (generally referred to as leaf switches 22) that connect hosts 16 to network 12, where m is a total number of ToR switches 22; access switches 24(1), 24(2), ..., and 24(M) (generally referred to as access switches 24) that aggregate network traffic from network traffic from ToR switches 22, where M is a total number of access switches 24; core switches 26(1), 26(2), ..., and 26(j) (generally referred to as core switches 26) that aggregate network traffic from access switches 24, where j is a total number of core switches 26; and aggregate switches 28 that aggregate network traffic from core switches 26, and further connect external network 20 and/or external hosts 18 to network 12. ToR switches 22, access switches 24, core switches 26, and aggregate switches 28 can connect to network 12 via network interfaces, such as ports through which ToR switches 22, access switches 24, core switches 26, and/or aggregate switches 28 connect to one another. In various embodiments, each ToR switch 22 can serve as a Top-Of-Rack (ToR) switch of a respective rack unit in a data center network environment, where network 12 serves as the data center network. ToR switches 22 can include host interfaces, for example, ports through which hosts 16 connect to ToR switches 22, such that leaf switches 22 can forward packets between hosts 16 over network 12 via access switches 24, core switches 26, and/or aggregate switches 28. Aggregate switches 28 can connect to external network 20 via another network interface, such that aggregate switches 28 can forward packets between hosts 16 and external hosts 18 over network 12 via core switches 26, access switches 24, and/or ToR switches 22. In some network topologies, network 14 can include one level of switches (such as a 2-tier fat tree topology) or multiple levels of switches (such as a 3-tier fat tree topology). Virtually any number of switches may be used in network 12 depending on network topology considerations for communication system 10. Furthermore, network 14 may be configured to achieve spine/leaf network topologies that include leaf switches, border leaf switches, and/or spine switches (also referred to as a fabric spine).

As used herein, the term "switch" includes any network element configured to receive packets from a source (e.g., host 16(1)) and forward packets appropriately to a destination in a network (e.g., host 16(n)) or a destination out of network (e.g., external host 18(1)). The term "ToR switch" is inclusive of routers, switches, and such other network elements with packet routing, bridging, and switching functionalities that are connected to one or more hosts (e.g., hosts 16). The term "aggregate switch" is inclusive of routers, switches, and such other network elements with packet routing, bridging, and switching functionalities that are connected to external entities, such as one or more external hosts (e.g., external hosts 18). The term "access switch" and/or "core switch" is inclusive of routers, switches, and such other network elements with packet routing, bridging, and switching functionalities that connect one or more switches (e.g., ToR switches 22, access switches 24, core switches 26, and/or aggregate switches 28). Further, the terms "ToR," "access," "core," and "aggregate" are used merely to distinguish between layers of switches in the network architecture depicted in FIG. 1, and are not meant to be limitations. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

Communication system 10 can include a network topology configured to include any number of servers, virtual machines, switches, routers, and other network nodes interconnected to form network 12. Network elements of FIG. 1 and FIG. 2 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For purposes of illustrating the techniques of communication system 10, it is important to understand the communications in a given system such as the architecture shown in FIG. 1 and FIG. 2. The following foundational information may be viewed as a basis from which the present disclosure may be properly explained. Such information is offered earnestly for purposes of explanation only and, accordingly, should not be construed in any way to limit the broad scope of the present disclosure and its potential applications.

Today's network environments, particularly data center network environments, store and analyze a massive amount of data. Challenges arise with how to analyze this massive amount of data to find critical pieces of information that provide a competitive edge. To address these challenges, network environments are turning to distributed application frameworks, striving to provide infrastructure that optimizes deployment of distributed application frameworks, while enhancing network performance associated with using distributed application frameworks. Distributed application frameworks can span across an entire network, where application workloads are distributed among multiple network elements of the network. As used herein, the term "distributed application" refers to software that executes or runs on multiple network elements (e.g., hosts 16, physical or virtual) in a network (e.g., network 12) to achieve a specific goal or task. Further, note that the term "application" as used herein can be inclusive of an executable file having instructions that can be understood and processed by a processor, including a computer, and may further include library modules loaded during execution, object files, system files, hardware logic, software logic, or any other executable modules.

Distributed applications may not have a fixed topology. For example, each instance of a distributed application may include a different logical set of applications that provide the same functionalities, but run on disparate network elements (e.g., hosts 16) that execute distributed applications at any instant in time, which may vary with network load, resource availability, and/or other network considerations. A distributed application can include multiple tiers, where each tier embodies various hardware, software, and management tools with myriad configuration parameters. Moreover, distributed applications can run over heterogeneous hardware platforms and operating systems. In a logical sense, a distributed application may include several layers of applications, for example, a web application layer that supports hypertext transfer protocol (HTTP) requests from users (e.g., associated with hosts 16 and/or external hosts 18); an application layer that provides personalized content to users; and a database layer that supports content management, business object persistence, and other data storage needs. In another logical sense, the distributed application may include a presentation layer (e.g., static web pages, Ajax pages, etc.); a business layer (e.g., Enterprise JavaBeans (EJB), legacy applications, etc.); and/or a persistence layer (e.g., relational databases, file servers, etc.).

Apache™ Hadoop® is an exemplary distributed application that will be used for purposes of describing details of the present disclosure, though details of the present disclosure are relevant to any distributed application, as described further below. Hadoop® can handle massive amounts of data—either transforming data to a more usable structure and format or analyzing and extracting valuable analytics from data. In particular, a Hadoop® application framework can store data sets across a cluster of servers (a Hadoop® distributed file system (HDFS) component) and then perform distributed processing on the cluster (a MapReduce component). Hadoop® clusters can include various nodes distributed across the network that store and/or process data. The HDFS component receives a data file (often referred to as input data), splits the data file into data blocks, and distributes the data blocks among the nodes. The data blocks are processed by the MapReduce component to generate result files, which can be stored in the HDFS component. To enhance reliability and availability of data, data assigned to one node is replicated among other nodes. This replication helps ensure that data can survive node failure or node unavailability. When processing the data, MapReduce workload processing can be divided into a map phase and a reduce phase. In various embodiments, the map phase includes dividing a submitted workload (data file) into smaller sub-workloads (data sub-blocks) and assigning the sub-workloads to mappers, where each mapper can process a sub-workload of the data file and output a sorted list of key-and-value pairs, which can be distributed and/or shuffled to reducers. Each reducer analyzes, condenses, and merges the list of key-value pairs to produce an output (results), which can be stored as a results file. Shuffle traffic can be associated with the process of sorting and transferring the list of key-and-value pairs to reducers. Hadoop® application framework thus manages various types of network traffic, such as ingest traffic, replication traffic, shuffle traffic, and/or other type traffic. Further, for each type of network traffic, underlying data associated with a network traffic type may have varying levels of criticality to Hadoop® application framework. Other distributed application frameworks also manage various types of network traffic in distributed processing environments.

Typically, distributed application frameworks, such as Hadoop® application framework, manage network traffic without considering associated underlying networks, essentially treating the underlying networks as a black box. For example, all network traffic managed by the distributed application framework is treated equally without prioritization. In Hadoop® application framework scenarios, ingest traffic (such as data associated with a new job) is treated the same as shuffle traffic and replication traffic. Various network performance issues can arise from treating all network traffic the same. For example, in some embodiments, storing and processing ingest traffic may be delayed in situations where replication traffic and/or shuffle traffic consume a majority of the underlying network's bandwidth. In another example, network traffic may have underlying data that necessitates a higher priority, yet the distributed application will provide all network traffic equally to the network regardless the underlying data associated with the network traffic. In some embodiments, replication traffic of data upon ingest would benefit from having a higher priority than replication traffic of data upon failure of a node that includes currently used data and/or failure of a node that includes archived data. In yet other embodiments, a processing event may contain unimportant data that can cause network delays, such as a failure of a node that contains archived data or unused data, which can produce ingest traffic that slows down network traffic associated with other tasks and/or jobs.

Communication system 10 is configured to address the issues described above (and others) in offering a system and method for prioritizing network traffic using application level awareness in a network environment. Embodiments of communication system 10 provide a distributed application framework for prioritizing network traffic using application priority awareness. By bringing application level prioritization to the network level, communication system 10 can dynamically and adaptively prioritize network traffic in network 12 based on various network parameters, including network traffic type (for example, ingest traffic, shuffle traffic, replication traffic, and/or other type of network traffic), a network traffic's load on network 12, importance of data associated with a given network traffic type (for example, delineating between replication traffic arising from a failure of data in a currently running job versus replication traffic arising from a failure of unused data (in some embodiments, unused for a few months)), and/or other network parameters. In contrast to other network traffic prioritization schemes that often consider only the network level (for example, by prioritizing data traffic based on network protocol (such as TCP or UDP) ports and/or application layer ports alone, though a same kind of network traffic with similar application ports may have different priorities, where such information is available only at the distributed application level as described above), network traffic prioritization schemes described herein further classify network traffic at the application level with application awareness, considering underlying application context (e.g., what trigger in the application caused the network traffic) and data associated with the network traffic, for example, based on a job producing the network traffic and/or network traffic type. Such configurations can improve network utilization by distributed applications, including improving network and distributed application performance, improving network throughput, and/or minimizing network bottlenecks. Different embodiments may have different advantages than described herein, and no particular advantage is necessarily required of any of the embodiments described herein.

Turning to FIG. 1 and FIG. 2, network 12 provides an infrastructure for deploying a distributed application framework that brings application priority knowledge to network 12. For example, a distributed application 30 is deployed in network 12 that spans various hosts 16. Distributed application 30 can distribute application workloads to the various hosts 16 for processing. In various embodiments, network 12 is configured to provide an infrastructure for deploying a distributed application such as a Hadoop® application framework, where in the present example, for purposes of discussion distributed application 30 represents Hadoop® application framework. In such configurations, a user can initiate a job by loading data into a cluster of hosts 16 (such as a cluster of servers) and describe how to analyze the data. The cluster of hosts 16 can process the data (including replicating the data and shuffling the data) to generate results and store the job results, where the user can access the results from the cluster of hosts 16.

In FIG. 2, distributed application 30 includes an application scheduler 32. Application scheduler 32 can accept jobs from users and schedule corresponding workloads for execution on hosts 16 that are part of distributed application 30. Each host 16 that is spanned by distributed application 30 acts as a work node that can carry out tasks provided by application scheduler 32, where hosts 16 spanned by distributed application 30 can handle multiple tasks in parallel. In various embodiments, when application scheduler 32 receives a request to execute a job within distributed application 30, application scheduler 32 determines what resources are available for executing the requested job. In various embodiments, application scheduler 32 can split the requested job into workloads (or tasks) and distribute the workloads on hosts 16 that are spanned by distributed application 30, for example, based on a scheduling policy.

Distributed application 30 further includes a modifiable priority list 34, which brings application level priority to network traffic 35 (data) arising from a job executing (or running) in network 12. Distributed application 30 can query modifiable priority list 34 to determine a network traffic priority of network traffic 35, for example, query priority of network traffic based on user privileges as described below. In various embodiments, modifiable priority list 34 can serve as a network traffic priority list for all jobs producing network traffic in network 12. In the depicted embodiment, modifiable priority list 34 includes a user priority list 36 and a task priority list 38, and distributed application 30 can assign network traffic priority based on both user priority list 36 and task priority list 38. In various embodiments, an administrator can define user priority list 36 and task priority list 38. Based on user priority list 36 (which can indicate who is running a job) and task priority list 38 (which can indicate what task associated with the job is running), distributed application 30 dynamically determines network traffic priority of network traffic in network 12. In various embodiments, application scheduler 32 can dynamically determine network traffic priority of network traffic corresponding to tasks scheduled and distributed across hosts 16. The present disclosure further contemplates other types of priority lists, priority definitions, and/or priority parameters that may be a part of modifiable priority list 34 and queried by distributed application 30 to assign network traffic priority to network traffic at the application level in network 12.

User priority list 36 (also modifiable) can be represented as depicted in Table 1, in various embodiments. User priority list 36 defines various users and/or groups ("User-Group") that can initiate a job in network 12, along with various priorities that can be assigned to jobs initiated by the users and/or groups. In various embodiments, the various users and/or groups can be associated with hosts 16 and/or external hosts 18.

TABLE 1

User Priority List

| User-Group | Priority | Default Priority |
|---|---|---|
| CXO | 0 | 1 |
| High SLA Customer | 0 | 1 |
| Mid SLA Customer | 1 | 2 |
| Administrator | 0 | 2 |
| Production | 2 | 2 |
| Infra | 3 | 3 |
| Generic | 2 | 3 |

For example, in Table 1, user priority list 36 can define the following users/groups: CXO (executive-level user-group), high service level agreement (SLA) customer, mid SLA customer, administrator, production, infra, generic, or other user-group depending on various configurations of network 12. For each user-group, user priority list 36 can further define a highest priority level a user-group can assign to a job (thereby allowing a user-group to suggest different priorities for the job) and a default priority assigned to the job if no priority is assigned by the user/group. In various embodiments, a job can be assigned priority level 0, 1, 2, 3, and so on, where priority level 0 represents a highest priority level that can be assigned to the job and priority level 3 or higher represents a lowest priority level that can be assigned to the job. For example, jobs initiated by a CXO or a high SLA customer are assigned a default priority level 1, though the CXO or the high SLA customer can bump the job's priority to priority level 0. Likewise, jobs initiated by an administrator are assigned a default priority level 2, though the administrator can bump the job's priority to priority level 0; and jobs initiated by a generic user are assigned a default priority level 3, though the generic user can bump the job's priority to priority level 2. Note that while the administrator can bump a job's priority to priority level 0 (highest defined priority level), the generic user cannot bump the job's priority to a level higher than priority level 2, according to Table 1. Oftentimes, since distributed application 30 may initiate a job in network 12 (for example, where distributed application 30 initiates a replication task upon a node failure), user priority list 36 defines priorities for jobs initiated by distributed application 30 (defined as infra user/group in Table 1). In the present example, jobs initiated by distributed application 30 are assigned the lowest defined priority level (e.g., priority level 3).

Task priority list 38 (also modifiable) can be represented as depicted in Table 2, in various embodiments. Task priority list 38 defines various tasks (identified by a task "ID" and a task "Type") associated with a job that can be performed in network 12. Task priority list 38 can further define each task by its associated network traffic (data). Since a job often involves various tasks having various types of network traffic, task priority can change throughout the job, as discussed in further detail below.

TABLE 2

Task Priority List

| ID | Priority | Max Bandwidth | Type |
|---|---|---|---|
| 1 | 1 | <40% of link or 500 MBPS | Ingest Data |
| 2 | 2 | <20% of link or 100 MBPS | Shuffle/Intermediate Data |
| 3 | 2 | <15% of link or 80 MBPS | Replication of Result Data |
| 4 | 3 | <10% of link or 50 MBPS | Replication of Input Data |
| 5 | 3 | <5% of link or 30 MBPS | Replication of Data Due to Node Failure of Currently Used/Accessed Data |
| 6 | 4 | <5% of link or 10 MBPS | Replication of Data Due to Node Failure of Unused Data (No Job Accessing Data) |

In various embodiments (for example, where distributed application 30 is configured as a Hadoop® application), a job can involve ingest tasks having associated ingest traffic, replication tasks having associated replication traffic, shuffling tasks having associated shuffling traffic, or other tasks having associated network traffic. In various embodiments, replication tasks are defined by its associated replication traffic—for example, replication of result data, replication of input data, replication of data due to a node failure of currently used/accessed data, and/or replication of data due to a node failure of unused data (in other words, no job is currently accessing the replicated data). For example, in Table 2, task priority list 38 can define the following tasks that may be associated with a job: task ID 1, ingest data; task ID 2, shuffle/intermediate data; task ID 3, replication of result data; task ID 4, replication of input data; task ID 5, replication of data due to a node failure of currently used/accessed data; task ID 6, replication of data due to node failure of unused data (for example, where no job is accessing the data being replicated); or other task. For each task, task priority list 38 can further define a priority level and a maximum bandwidth of a network link that can be allocated to each defined task. In various embodiments, each task can be assigned priority level 1, 2, 3, 4, and so on, where priority level 1 represents a highest priority level that can be assigned to the task and priority level 4 or so on represents a lowest priority level that can be assigned to the task. In various embodiments, where multiple network traffic types are flowing through network 12, tasks are allocated bandwidth in a manner that ensures no one task or no one type of network traffic consumes 100% of a network link. According to Table 2, ingest tasks are allocated less than or equal to 40% (or 500 Mbps) of a network link, shuffle tasks are allocated less than or equal to 20% (or 100 Mbps) of the network link, replication tasks of result data are allocated less than or equal to 15% (or 80 Mbps) of the network link, replication tasks of input data are allocated less than or equal to 10% (or 50 Mbps) of the network link, replication tasks of data due to a node failure of currently used/accessed data are allocated less than or equal to 5% (or 30 Mbps) of the network link, and replication tasks of data due to a node failure of unused data are allocated less than or equal to 5% (or 10 Mbps) of the network link. Note that task priority list 38 not only provides for network traffic associated with different tasks but also different types of network traffic associated with a same task. For example, replication tasks can involve four different network traffic types, where task priority list 38 assigns a priority level to each network traffic type—result data having a high priority (e.g., priority level 2), input data and/or currently used data associated with a node failure having a medium/high priority (e.g., priority level 3), and unused data associated with a node failure having a low priority (e.g., priority level 4). Accordingly, the disclosed distributed application framework can capture a context of network traffic and assign different priorities to network traffic based on the context. Such priority assignment can occur even though the different types of network traffic may have a same nature of packets in network 12, for example, a same destination port (e.g., a same TCP destination port).

As noted, distributed application 30 spans various hosts 16 in network 12, where network 14 connects the various hosts 16 to facilitate the distributed application framework. In FIG. 2, network 14 includes a network traffic classification model 40 that can classify (mark) network traffic 35 for quality of service (QoS) through various network classification methodologies, such as access control lists, along with applying mapping and/or policies to network traffic 35, bringing application level priority to network traffic 35 arising from a job executing (or running) in network 12. In various embodiments, network traffic classifier 40 can define various policies and/or priorities for routing network traffic to/from hosts 16 and/or external hosts 18. Network 14 can perform traffic classification for metric collection, bandwidth provisioning, resource allocation, security policy enforcement, and/or other reason. For example, network traffic classification model 40 can provide policy-based QoS network traffic classification (marking) using any appropriate QoS technology, including access control lists (ACL), policy-based routing (PBR), class-based routing (CBR), which in turn can use various technologies for tagging network traffic to specific priorities (for example, differentiated services (DiffServ), IP Precedence (IPP), or other priority QoS signaling mechanism), and/or other appropriate QoS technology. In furtherance of the example, network traffic classification model 40 can also provide policing, such as bandwidth policing that can be achieved through various technologies, such as class-based policing and/or committed access rate (which can use QoS classification and other technologies to limit input rate and/or output rate for an interface/port).

Here, network traffic classification model 40 implements access control lists (ACLs) 42 for filtering network traffic that traverses network 14. ACLs 42 use various access criteria, including source address of network traffic, destination address of network traffic, protocol associated with network traffic, and/or other information. In various embodiments, ACLs 42 are attached to network elements of network 14, where the network elements can decide whether to forward or filter (for example, drop) network traffic based on ACLs 42. For example, switches including ToR switches 22, access switches 24, core switches 26, and/or aggregate switches 28 of network 14 can examine network traffic to determine whether to forward or filter network traffic based on criteria specified in ACLs 42. In various embodiments, ACLs 42 can block or permit network traffic having specific addresses or ranges of addresses to be received or transmitted by the switches. In various embodiments, described further below, ACLs 42 can include access control lists that define different network traffic filtering criteria for different priority network traffic. For example, ACLs 42 can include an access control list that defines network traffic filtering criteria for network traffic associated with CXO and high SLA user-groups (which can be referred to as a cxo-high-sla access control list); an access control list that defines network traffic filtering criteria associated with high priority shuffle traffic and high priority replication traffic (which can be referred to as a high-priority-shuffle-replication access control list); an access control list that defines network traffic filtering criteria associated with low priority shuffle traffic and mid-priority replication traffic (which can be referred to as a low-shuffle-mid-replication access control list); an access control list that defines network traffic filtering criteria associated with low priority replication traffic (which can be referred to as a low-priority-replication access control list); and an access control list that defines various access criteria associated with low priority background tasks (which can be referred to as a low-priority-background-tasks access control list). Criteria (filters) of ACLs 42, such as source ports, destination ports, and/or network protocols, can be populated dynamically based on network traffic resulting from jobs running and/or initiated in network 12. Such knowledge will be available to distributed application 30, and as network traffic flows originate, the criteria (filters) can be added to respective ACLs 42 based on network traffic priority.

Switches of network 12 (here, ToR switches 22, access switches 24, core switches 26, and/or aggregate switches 28) can mark network traffic 35 (for example, using various technologies and/or protocols mentioned above), thereby applying QoS features to network traffic 35. In various embodiments, network classification model 40 can implement QoS marking 44, which can define a level of classification using class maps and/or policy maps globally, where the class maps and/or policy maps apply to (attach to) each network element associated with network 14. For example, a class map and/or policy map is attached to any network element responsible for directing network traffic flows in network 12 (such as ToR switches 22, access switches 24, core switches 26, and/or aggregate switches 28). An administrator can define the class maps, which define network traffic according to various criteria based on desired filtering/classifying configurations, and/or policy maps, which can define actions and/or functions that can be applied to classified network traffic. Network traffic can then be classified based on match criteria specified by the class maps and/or policy maps. A traffic class can be defined by a class map name, one or more match commands that define match criteria for the class map, and instructions on how to evaluate match commands when the administrator has specified more than one match command (for example, a match any command or match all command). In various embodiments, network traffic priority classes can be defined, where network traffic is assigned to network traffic priority classes.

For purposes of the following discussion, QoS marking 44 can define network traffic classes having defined QoS policies and/or priorities, while further specifying bandwidth utilization across network elements of network 14. In various embodiments, QoS marking 44 can implement class-based QoS policy for network elements responsible for directing network traffic (such as switches of network 14), though it is noted that the present disclosure contemplates QoS marking 44 implementing any network traffic classification technology and/or protocol. For example, QoS marking 44 can include a class-based QoS policy map that defines traffic classes, traffic policies associated with the traffic classes, policing policies associated with the traffic classes, and/or other network traffic filter/classification parameters. Class-based QoS policy map can define traffic policies for various network traffic classes, essentially defining a number of network traffic lanes for switches in network 14. For example, an exemplary class-based QoS policy map named policyHadoopLikeDistributedSystem can be defined by Router(config)# policy-map command, and configured on each network element (for example, each switch), as follows:

```
Router(config)# policy-map policyHadoopLikeDistributedSystem
Router(config-pmap)# class top-priority
Router(config-pmap-c)# match access-group cxo-high-sla
Router(config-pmap-c)# priority percent 40
Router(config-pmap)# exit
Router(config-pmap)# class second-priority
Router(config-pmap-c)# match access-group high-priority-shuffle-
replication
Router(config-pmap-c)# priority percent 20
Router(config-pmap)# exit
Router(config-pmap)# class third-priority
Router(config-pmap-c)# match access-group low-shuffle-mid-replication
Router(config-pmap-c)# priority percent 15
Router(config-pmap)# exit
Router(config-pmap)# class fourth-priority
Router(config-pmap-c)# match access-group low-priority-replication
Router(config-pmap-c)# priority percent 10
Router(config-pmap-c)# police output 8000000 100000
Router(config-pmap)# exit
Router(config-pmap)# class last-priority
Router(config-pmap-c)# match access-group low-priority-background-
tasks
Router(config-pmap-c)# priority percent 5
Router(config-pmap-c)# police output 8000000 100000
Router(config-pmap)# exit
```

Here, class-based QoS policy map defines five different network traffic priority classes for network elements (such as for each switch of network 14), where network traffic belongs to a defined network traffic priority class when it matches a specified access control list, such as one of ACLs 42. For example, Router(config-pmap)# class commands can define a top-priority network traffic class, a second-priority network traffic class, a third-priority network traffic class, a fourth-priority network traffic class, and a last-priority network traffic class. In various embodiments, Router(config-pmap-c)# match access-group commands will place network traffic assigned to cxo-high-sla access control list in top-priority network traffic class, network traffic assigned to high-priority-shuffle-replication access control list in second-priority network traffic class, network traffic assigned to low-shuffle-mid-replication access control list in third-priority network traffic class, network traffic assigned to low-priority-replication access control list in fourth-priority network traffic class, and network traffic assigned to low-priority-background-tasks access control list in last-priority network traffic class. Further, class-based QoS policy map define QoS features for each defined network traffic priority class, such as a priority assigned to the network traffic priority class that specifies a percentage (or data transfer rate, such as kilobytes per second (kbps)) of a network link's bandwidth reserved for the network traffic priority class, and/or a traffic policing parameter that can limit an input data rate or output data rate of the network traffic priority class for a network element (such as a switch interface (port)). For example, using Router(config-pmap-c)# priority commands, class-based QoS policy map configures (and essentially guarantees) 40% of a network link's bandwidth to top-priority network traffic class, 20% of the network link's bandwidth to second-priority network traffic class, 15% of the network link's bandwidth to third-priority network traffic class, 10% of the network link's bandwidth to fourth-priority network traffic class, and 5% of the network link's bandwidth to last-priority network traffic class. A remaining 10% of the network link's bandwidth can be allocated to network traffic assigned to a default class, or used by any of the network traffic priority classes. In various embodiments, when a given network traffic priority class is not using its configured bandwidth, the other network traffic priority classes can share any unused bandwidth. For example, if top-priority network traffic class is using only 20% of the network link's bandwidth, the other priority network traffic classes can share the other 20% of the network link's bandwidth reserved for top-priority network traffic class. In various embodiments, when network 12 experiences congestion, no priority network traffic class can use bandwidth in excess of that allocated.

In furtherance of the example, a police command can be defined that suggests dropping packets when defined limits are exceeded, such as that defined for the fourth-priority network traffic class and the last-priority network traffic class. Using Router(config-pmap-c)# police commands, class-based QoS policy map configures a maximum amount of traffic (by data transfer rate, such as bits per second (bps)) and burst size (how much network traffic can be sent within a given time without creating scheduling concerns) that can be output by the network element implementing class-based QoS policy map. For example, for fourth-priority network traffic class and low-priority network traffic class, network traffic can be output from network elements implementing class-based QoS policy map (such as switches of network 14) at a maximum rate of 8,000,000 bits/second and/or a maximum burst size of 100,000 bytes per second. Network traffic belonging to the fourth-priority network traffic class or low-priority network traffic class that exceeds these parameters will be dropped by the associated network element routing the network traffic, thereby providing "policing" of the network traffic. Class-based QoS policy map can further define other QoS features not specified in the present example.

In the distributed application framework described herein, an application network manager 50 (also referred to as an application network controller) can bring intelligence of distributed application 30 to network 12 (for example, network elements of network 14 can direct network traffic using application priority awareness) and intelligence of network 12 to distributed application 30 (for example, distributed application 30 can evaluate network traffic characteristics to assign network traffic priority). Application network manager 50 is an application implemented on one or more suitable network elements configured with appropriate hardware and software components to perform the operations described herein. For example, the application can be implemented on switches of network 14, hosts 16, external hosts 18, or other network element. In various embodiments, application network manager 50 can be implemented as a plug-in to the distributed application framework of network 12, allowing the distributed application to become network aware, improving network utilization, network performance, and/or network predictability for network 14 and/or distributed application 30. In various embodiments, application network manager 50 can include a processor 50 and a memory element 52 that can be used to perform operations described herein. The memory element 52 can store information associated with network 12, in some embodiments, consolidating information associated with network 14 and distributed application 30. Application network manager 50 can be a part of distributed application 30, such as a part of Hadoop® like application framework, or as a stand-alone application (in other words, separate from distributed application 30). In various embodiments, application network manager 50 and application scheduler 32 can reside in a same application. In some embodiments, application network manager 50 can be a distributed application. In some embodiments, application network manager 50 can be distributed across more than one application.

In various embodiments, network 12 can implement an application-defined networking (ADN) or software-defined networking (SDN) environment, where an application can adapt network 12 to meet requirements (for example, network and/or security policies) of the application. In SDN networking environments, network 12 can be configured to decouple a control plane and a data plane, moving the control plane (such as network intelligence and policy making) to an application, which can be referred to as an SDN controller. In such scenarios, application network manager 50 can be implemented as an SDN controller for network 12. In various embodiments, communication between the distributed application framework and network framework can be implemented as part of SDN applications using available communication technologies, such as OpenFlow, SNMP, onePK (Cisco® One Platform Kit) for communication with network 12 to gather information.

In FIG. 2, application network manager 50 is configured to communicate with an application level (e.g., distributed application 30) and a network level (e.g., network 14) of network 12. For example, application network manager 50 can communicate with distributed application 30 and network 14 (in particular, switches of network 14, such as ToR switches 22, access switches 24, core switches 26, and/or aggregate switches 28) to exchange information between distributed application 30 and network 14. Application network manager 50 can receive priority information, such as network traffic priority, associated with network traffic 35 from distributed application 30. In some embodiments, application network manager 50 communicates with application scheduler 32 to obtain network traffic priority information. Based on the network traffic priority, application network manager 50 dynamically adds network traffic 35 to ACLs 42, which as detailed above are associated with different network traffic priority classes (for example, network traffic priority classes defined by class-based QoS policy map) for prioritizing and/or rate limiting network traffic associated with particular tasks. According to the present disclosure, in various embodiments, only ACLs 42 are updated dynamically, while QoS marking features defined by QoS marking 44 (such as policy maps, class maps, and/or network traffic priorities) can be globally added once to network elements of network 12. In various embodiments, dynamic changes are not made to QoS marking features defined by QoS marking 44. In some embodiments, dynamically updating ACLs 42 can be implemented by an application programming interface associated with application network manager 50.

A network traffic prioritization protocol (also referred to as a data traffic prioritization protocol) can be implemented by application network manager 50 that involves assigning network traffic to ACLs 42 based on what network traffic class the network traffic belongs to based on network traffic priority (which considers who is running the job and what task is generating the network traffic). Network traffic prioritization protocol can be implemented at various network traffic levels. For example, in scenarios where distributed application 30 is implemented as Hadoop® like application frameworks, network traffic prioritization protocol can be implemented to assign ingest traffic (for example, associated with new job data), replication traffic, shuffle traffic (or intermediate traffic within network 12), or other network traffic type to ACLs 42.

Figure 3:
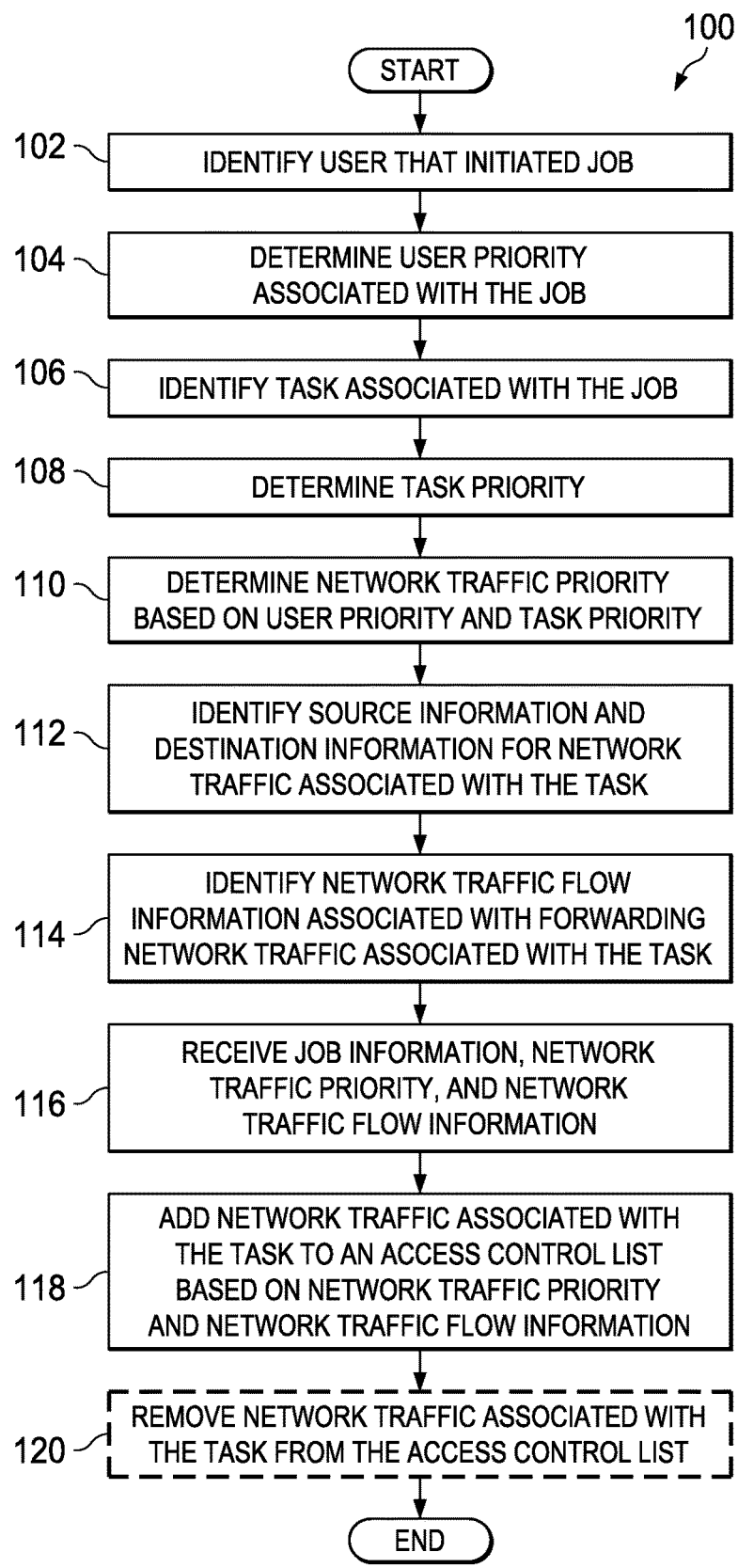
FIG. 3 is a simplified flow diagram illustrating example operations that can be associated with an embodiment of the communication system.

Turning to FIG. 3, FIG. 3 is a simplified flow diagram illustrating an exemplary method 100 that may be associated with embodiments of communication system 10. In various embodiments, method 100 can involve application network manager 50 communicating with distributed application 30 and network 14 to achieve application level awareness for network 14 and network level awareness for distributed application 30. At block 102, distributed application 30 (for example, application scheduler 32) can receive a job, and identify a user-group (in other words, who) initiated the job. At block 104, distributed application 30 determines identifies a user priority level associated with the job. For example, distributed application 30 may determine that the user-group has assigned a priority level to the job, where distributed application 30 uses the assigned user priority level. In some embodiments, a job priority could be received when the job is initiated. In another example, distributed application 30 can query user priority list 36 to determine user priority level. In some embodiments, the user priority level is a default priority level defined for jobs initiated by the user-group. At block 106, distributed application 30 determines a task associated with the job. For example, in various embodiments, distributed application 30 determines a task ID associated with a task of the job, where the task ID may be associated with an ingest task, a replication task, or a shuffle task. In various embodiments, different task IDs can be associated with a same task that generates different network traffic types. At block 108, distributed application 30 can determine a priority level of the identified task by querying task priority list 38. At block 110, distributed application 30 can then determine a network priority level for network traffic associated with the task based on the user priority and the task priority. In various embodiments, network priority level can be determined simply by summing the user priority and the task priority.

At block 112, distributed application 30 (for example, application scheduler 32) can identify source information and destination information for network traffic associated with the task. For example, distributed application 30 can determine where to direct network traffic associated with the task, such as a source node and a destination node, which can be one of hosts 16 and/or one of external hosts 18. In various embodiments, distributed application 30 can negotiate with network elements of network 12 to identify source nodes and destination nodes. At block 114, distributed application 30 can identify network traffic flow information associated with forwarding network traffic associated with the task. For example, distributed application 30 can start the task to identify network elements for receiving/forwarding network traffic associated with the task. In another example, distributed application 30 determines network elements for receiving/forwarding network traffic associated with the task and communicates with the network elements to obtain network traffic flow information (for example, a port or interface of the network elements that will receive the network traffic). In various embodiments, application scheduler 32 can identify network elements of network 14 (for example, ToR switches 22, access switches 24, core switches 26, and/or aggregate switches 28) that will receive/forward network traffic associated with the task from a source and to a destination. For example, application scheduler 32 can identify each switch involved in the network traffic flow from source to destination. In various embodiments, network traffic flow information associated with the network traffic flow can include source port, source IP address, destination port, destination IP address, and/or other network traffic flow information.

At block 116, distributed application 30 communicates the job information and its associated network traffic flow information to application network manager 50. For example, application network manager 50 receives a job ID associated with the job, a network traffic priority level of network traffic associated with the task, and corresponding network traffic flow information (e.g., source port, source IP address, destination port, destination IP address) from application scheduler 32. At block 118, application network manager 50 adds network traffic associated with the task to an access control list based on the network traffic priority and network traffic flow information. For example, application network manager 50 adds network traffic associated with the task to access control lists of any network elements (such as switches) that will be carrying the network traffic. In various embodiments, application network manager 50 identifies switches in network 14 from the network traffic flow information (e.g., source port, source IP address, destination port, destination IP address), and application network manager 50 communicates with any the switches that will carry the network flow, such that each switch is configured to permit network traffic from the source node associated with the source IP address and to the destination node associated with the destination IP address with the network traffic priority as defined by respective ACLs 42. For example, based on network traffic priority level of network traffic associated with the task, application network manager 50 assigns network traffic associated with the task to an access control list associated with switches (such as one of ACLs 42) and updates the access control list to include an ACL entry that includes the source IP address and destination IP address for network traffic associated with the task. As noted above, ACLs 42 are matched with network traffic priority classes having defined QoS features. Accordingly, the ACL entry automatically adds network traffic associated with the task to QoS supervision for priority and bandwidth policing. The switches then know how to filter network traffic associated with the task. At block 120, once network traffic associated with the task ceases (for example, the task is completed or halted), distributed application 30 can notify application network manager 50, which can then remove the ACL entry from the ACL attached to the switches.

The foregoing discussion describes a distributed application framework for dynamically and adaptively prioritizing network traffic in network 12 using application level awareness at the network level, which is described herein in a context of Hadoop® like application frameworks. It is noted that the present disclosure is not limited to Hadoop® like application frameworks, and the dynamic and adaptive prioritization schemes described herein can be applied to any distributed application framework. Such configurations can improve network utilization, improve workload scheduling efficiency, and/or improve network traffic prioritization.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, application network manager 50. In some embodiments, one or more of these features may be implemented in hardware, provided external to these elements, or consolidated in any appropriate manner to achieve the intended functionality. The various network elements (e.g., application network manager 50) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, application network manager 50 and other components of communication system 10 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 52) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein. In one example, processors (e.g., processor 50) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 52) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  determining a network traffic priority for network traffic associated with a job performed by a distributed application, wherein the distributed application comprises a plurality of jobs, each of which executes on a different one of a plurality of servers interconnected via a network to achieve a specific goal; and
  based on the network traffic priority, assigning the network traffic to a network classification model associated with a network element for directing the network traffic in a network, wherein the network classification model is associated with a network traffic priority class having defined quality of service (QoS) features, such that the network traffic traverses the network according to the defined QoS features;
  wherein the network traffic priority is based on a user priority associated with a user that initiated the job, a task priority associated with a task of the job that generates the network traffic, and a priority of a type of data comprising the network traffic;
  wherein the type of data comprising network traffic comprises at least one of ingest data, intermediate data, replication of result data, replication of input data, replication of data due to node failure of currently used/accessed data, and replication of data due to node failure of unused data; and
  wherein assigning the network traffic to the network classification model includes updating an access control list with an access control list entry that includes a source port, a source IP address, a destination port, and a destination IP address associated with the network traffic;
  the method further including removing the access control list entry once network traffic associated with the task ceases.

2. The method of claim 1, wherein the network classification model includes an access control list.

3. The method of claim 1, further including:
  receiving network traffic flow information for the network traffic; and
  identifying the network element based on the network traffic flow information.

4. The method of claim 3, wherein identifying the network element includes identifying at least one switch involved with directing the network traffic, wherein the network traffic is assigned to an access control list attached to the at least one switch.

5. The method of claim 1, wherein a priority level of the task priority varies based on underlying data of the network traffic, context that generated the underlying data of the network traffic, or both.

6. The method of claim 1, wherein the user priority is assigned to the job by the user or assigned to the job based on a default user priority associated with the user.

7. The method of claim 1, wherein the QoS features define a percentage of a bandwidth of a network link reserved for the network traffic priority class.

8. The method of claim 1, wherein the QoS features define a maximum output rate for the network traffic priority class for the network element when the network is congested.

9. Logic encoded in non-transitory media that includes instructions for execution and when executed by a processor, is operable to perform operations comprising:
  determining a network traffic priority for network traffic associated with a job performed by a distributed application, wherein the distributed application comprises a plurality of jobs, each of which executes on a different one of a plurality of servers interconnected via a network to achieve a specific goal; and
  based on the network traffic priority, assigning the network traffic to a network classification model associated with a network element for directing the network traffic in a network, wherein the network classification model is associated with a network traffic priority class having defined quality of service (QoS) features, such that the network traffic traverses the network according to the defined QoS features;
  wherein the network traffic priority is based on a user priority associated with a user that initiated the job, a task priority associated with a task of the job that generates the network traffic, and a priority of a type of data comprising the network traffic;
  wherein the type of data comprising network traffic comprises at least one of ingest data, intermediate data, replication of result data, replication of input data, replication of data due to node failure of currently used/accessed data, and replication of data due to node failure of unused data; and
  wherein assigning the network traffic to the network classification model includes updating an access control list with an access control list entry that includes a source port, a source IP address, a destination port, and a destination IP address associated with the network traffic;
  the operations further including removing the access control list entry once network traffic associated with the task ceases.

10. The logic of claim 9, the operations further including:
  receiving network traffic flow information for the network traffic; and
  identifying the network element based on the network traffic flow information.

11. The logic of claim 10, wherein identifying the network element includes identifying at least one switch involved with directing the network traffic, wherein the network traffic is assigned to an access control list attached to the at least one switch.

12. The logic of claim 9, wherein a priority level of the task priority varies based on underlying data of the network traffic, context that generated the underlying data of the network traffic, or both.

13. The logic of claim 9, wherein the QoS features defines a percentage of a bandwidth of a network link reserved for the network traffic priority class.

14. An apparatus comprising:
  a memory element for storing data; and
  a processor operable to execute instructions associated with the date, wherein the processor and the memory element cooperate such that the apparatus is configured for:
    determining a network traffic priority for network traffic associated with a job performed by a distributed application, wherein the distributed application comprises a plurality of jobs, each of which executes on a different one of a plurality of servers interconnected via a network to achieve a specific goal; and based on the network traffic priority, assigning the network traffic to a network classification model associated with a network element for directing the network traffic in a network, wherein the network classification model is associated with a network traffic priority class having defined quality of service (QoS) features, such that the network traffic traverses the network according to the defined QoS features;

wherein the network traffic priority is based on a user priority associated with a user that initiated the job, a task priority associated with a task of the job that generates the network traffic, and a priority of a type of data comprising the network traffic;

wherein the type of data comprising network traffic comprises at least one of ingest data, intermediate data, replication of result data, replication of input data, replication of data due to node failure of currently used/accessed data, and replication of data due to node failure of unused data; and wherein assigning the network traffic to the network classification model includes updating an access control list with an access control list entry that includes a source port, a source IP address, a destination port, and a destination IP address associated with the network traffic;

the apparatus further configured for removing the access control list entry once network traffic associated with the task ceases.

15. The apparatus of claim 14, further configured for:

receiving network traffic flow information for the network traffic; and identifying the network element based on the switch information.

16. The apparatus of claim 14, wherein:

the QoS features define a percentage of a bandwidth of a network link reserved for the network traffic priority class, a maximum output rate for the network traffic priority class for the network element when the network is congested, or both.

* * * * *